(12) United States Patent
Medelius et al.

(10) Patent No.: US 6,552,521 B1
(45) Date of Patent: Apr. 22, 2003

(54) SINGLE STATION SYSTEM AND METHOD OF LOCATING LIGHTNING STRIKES

(75) Inventors: Pedro J. Medelius, Merritt Island, FL (US); Stanley O. Starr, Indialantic, FL (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/906,014

(22) Filed: Jul. 10, 2001

Related U.S. Application Data
(60) Provisional application No. 60/217,601, filed on Jul. 11, 2000.

(51) Int. Cl.[7] .............................................. G01R 31/02
(52) U.S. Cl. ...................................................... 324/72
(58) Field of Search ........................... 324/72; 340/600, 340/601, 602; 702/4; 342/460, 465

(56) References Cited

U.S. PATENT DOCUMENTS

| | | | |
|---|---|---|---|
| 3,772,594 A | 11/1973 | Kuehnast | 324/72 |
| 4,138,660 A | 2/1979 | Hill | 367/127 |
| 4,792,806 A | 12/1988 | Bent et al. | 342/465 |
| 4,801,942 A | 1/1989 | Markson et al. | 342/460 |
| 4,803,421 A | 2/1989 | Ostrander | 324/72 |
| 4,806,851 A * | 2/1989 | Krider et al. | 324/72 |
| 4,823,228 A | 4/1989 | Bittner | 361/218 |
| 4,873,483 A | 10/1989 | Ostrander | 324/72 |
| 4,894,785 A * | 1/1990 | Fernandes | 340/602 |
| 4,972,195 A | 11/1990 | Markson et al. | 342/460 |
| 5,140,523 A | 8/1992 | Frankel et al. | 702/4 |
| 5,235,341 A | 8/1993 | Effland et al. | 342/460 |
| 5,263,368 A | 11/1993 | Breitmeier et al. | 73/170.24 |
| 5,295,071 A | 3/1994 | Kuzma et al. | 702/4 |
| 5,331,330 A | 7/1994 | Susnjara | 342/460 |
| 5,771,020 A | 6/1998 | Markson et al. | 342/460 |
| 5,977,762 A | 11/1999 | Murtha, Jr. et al. | 252/70 |
| 6,420,862 B2 * | 7/2002 | Medelius et al. | 324/72 |

OTHER PUBLICATIONS

NASA Technical Opportunity Sheet (Website Jan. 4, 1999).
P.J. Medelius & H. J. Simpson "Accurate Lightning Loction System," pp. 112–113 from Research and Technology 1997 Annual Report, John F. Kennedy Space Center. No month available.

* cited by examiner

Primary Examiner—N. Le
Assistant Examiner—Vincent Q. Nguyen
(74) Attorney, Agent, or Firm—Randall M. Heald; Gary G. Borda; John G. Mannix

(57) ABSTRACT

An embodiment of the present invention uses a single detection system to approximate a location of lightning strikes. This system is triggered by a broadband RF detector and measures a time until the arrival of a leading edge of the thunder acoustic pulse. This time difference is used to determine a slant range R from the detector to the closest approach of the lightning. The azimuth and elevation are determined by an array of acoustic sensors. The leading edge of the thunder waveform is cross-correlated between the various acoustic sensors in the array to determine the difference in time of arrival, ΔT. A set of ΔT's is used to determine the direction of arrival, AZ and EL. The three estimated variables (R, AZ, EL) are used to locate a probable point of the lightning strike.

27 Claims, 8 Drawing Sheets

SINGLE STATION SYSTEM AND METHOD OF LOCATING LIGHTNING STRIKES

This application claims the benefit of provisional application No. 60/217,601, filed Jul. 11, 2000.

ORIGIN OF THE INVENTION

The invention described herein was made in the performance of work under a NASA contract and is subject to the provisions of Section 305 of the National Aeronautics and Space Act of 1958, as amended, Public Law 85-568 (72 Stat. 435; 42 U.S.C. §2457).

TECHNICAL FIELD OF THE INVENTION

The present invention relates generally to identifying locations of lightning strikes.

BACKGROUND OF THE INVENTION

Electronic equipment is susceptible to damage caused by nearby lightning strikes. The accurate knowledge of a lightning striking point is important to determine which equipment or system needs to be tested following a lightning strike. Existing lightning location systems can provide coverage of a wide area. For example, a lightning location system can provide coverage of an area having a 30 km radius. This system, however, has a 50% confidence region of about 500 meters. That is, the system has a 50% confidence that a lighting strike is within 500 meters of an identified location. As such, present lightning location systems cannot be used to determine whether a lightning strike occurred inside or outside of a parameter of an area of concern. One such application of a lightning location system is a Space Shuttle launch pad for the National Aeronautics and Space Administration (NASA). By accurately determining lightning strike locations, electronic equipment located within the launch pad area can be tested and/or reset to avoid erroneous operation.

One method of determining the location of lightning strikes uses a set of video cameras that are pointed in different directions within the area of concern. If a lightning strike occurs within the field of view of three or more cameras, the location of the strike can be determined. However, if the cameras are not pointed in the correct direction, or either an object or a heavy rain downpour obscures their field of view, it is difficult or impossible to accurately determine a striking point of the lightning. Further, this method has a relatively large uncertainty and does not facilitate an accurate location of the exact point of contact to the ground.

For the reasons stated above, and for other reasons stated below which will become apparent to those skilled in the art upon reading and understanding the present specification, there is a need in the art for the system and method to accurately approximate locations of lightning strikes.

SUMMARY OF THE INVENTION

The above-mentioned problems with lightning strike location and other problems are addressed by the present invention and will be understood by reading and studying the following specification.

In one embodiment, a system to determine an approximate location of lighting strikes comprises an electric field sensor, a plurality of acoustic sensors collocated with the electric field sensor, and a processor to determine the location of lighting strikes based on a time differential between an electric field pulse and a acoustic wave.

In another embodiment, a system to determine an approximate location of lighting strikes comprises an electric field sensor, a plurality of acoustic sound sensors collocated with the electric field sensor, a temperature sensor, and a processor. The processor determines the location of lighting strikes based on a time differential between an electric field pulse and a acoustic wave. The processor uses a look-up table to compensate for ambient temperature measured by the temperature sensor.

A method for determining an approximate location of a lightning strike comprises collecting lightning strike information, including a time of arrival of an electric field pulse using an electric field sensor and time of arrival data of an associated sonic wave from a lightning strike. The sonic wave data is detected using a plurality of acoustic sensors collocated with the electric field sensor, and processing the lightning strike information to approximate the location of the lightning strike.

Another method for determining an approximate location of a lightning strike comprises detecting an electric field signal, detecting a sonic pulse with a plurality of collocated sensors, measuring a time of arrival difference between the electric field signal and the sonic pulse, and determining a range, azimuth and elevation of the lighting strike.

DETAILED DESCRIPTION OF THE INVENTION

Figure 1:
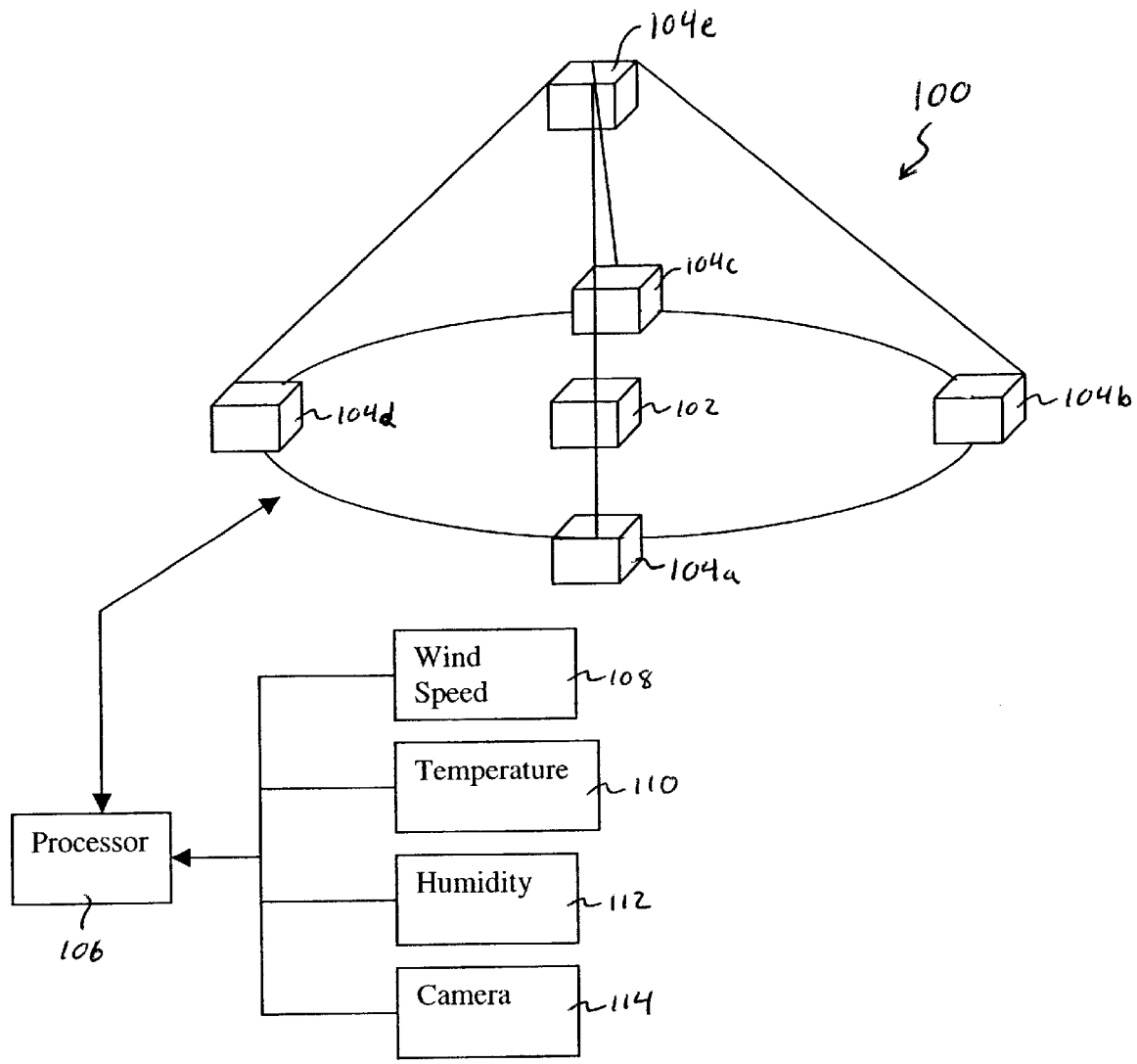
FIG. 1 illustrates one embodiment of a single lightning location system.

In the following detailed description of the preferred embodiments, reference is made to the accompanying drawings that form a part thereof, and in which is shown by way of illustration specific preferred embodiments in which the present invention may be practiced. These embodiments are described in sufficient detail to enable those skilled in the art to practice the present invention, and it is to be understood that other embodiments may be utilized and that logical, mechanical and electrical changes may be made without departing from the spirit and scope of the present invention. The following detailed description is, therefore, not to be taken in a limiting sense, and the scope of the invention is defined only by the claims.

The present invention provides a system and method that can accurately locate a lightning strike within an area of interest. In one embodiment, the present invention can accurately locate a lightning strike within a few meters. The fast varying electric current associate with lightning discharges generates large electric field variations. The electric field waveform propagates at the speed of light in a radial direction from the striking point of lightning. The sudden heating of the air caused by the large currents associated with the lightning discharge produces a sudden expansion of the air near the lightning channel. This results in a sonic wave (thunder) that initially, for the first few meters, propagates at a supersonic speed and later propagates at a sonic speed.

For an observer located remotely from a lightning strike location, the electric field waveform arrives earlier than the sonic sounds. This is because the electric field waveform travels and a speed of approximately 300,000,000 m/s, while the sonic wave travels and approximately 350 m/s. An observer can determine the distance to the striking point by measuring the time difference between the arrival of the electric field waveform and the arrival of the sonic wave. This measurement defines a circle, with the observer at the center, in which the lightning strike might have occurred. A second observer at a different location using the same type of measurement also has a circle defined around them in which the lightning might have occurred. These two circles intersect at two points. With the addition of a third observer, a single striking point can be determined.

In an embodiment described in U.S. patent application Ser. No. 09/784,405 filed Feb. 13, 2001 now U.S. Pat. No. 6,420,862, a lightning locator uses several (at least three) remote receiver stations each equipped with a broad band antenna and a microphone. The antenna detects lightning through its strong electromagnetic pulse and starts a timer. The timer is turned off by a detection of the arrival of the sound wave due to thunder. Range is estimated by multiplying the time delay by the speed of sound. The ranges detected by each receiver are transmitted to a central processor to estimate the location of the lightning strike.

An embodiment of the present invention uses a single detection system. This system is triggered by a broadband RF detector and measures a time until the arrival of a leading edge of the thunder acoustic pulse. This time difference is used to determine a slant range R from the detector to the closest approach of the lightning channel. The azimuth and elevation (AZ and EL) are determined by an array of acoustic sensors with one to several meter baselines. The leading edge of the thunder waveform is cross-correlated between the various microphones in the array to determine the difference in time of arrival (DTOA or ΔT). A set of ΔT's is used to determine the direction of arrival (AZ and EL). The three estimated variables (R, AZ, EL) are used to locate a probable point of the lightning strike.

The present invention provides a lightning location system that uses a single station to determine an approximate location of lightning strikes. One embodiment of the present location station 100 includes an electric field sensor 102 and five sonic all receivers 104*a–e*, see FIG. 1. Four sonic sensors 104*a–d* are located in a periphery of a circle at 90 degrees from each other. For example, the sensors can be placed on a 5-meter radius circle. The electric field sensor 102 is located at the center of the circle. The fifth sonic sensor 104*e* is located above the plane formed by the four sensors, such as 2 meters above the plane. The station, therefore, resembles a pyramid or a conical shape. A processor 106 is coupled to the sonic and electric field sensors to control the station and process data. As explained herein, wind speed sensor 108, temperature sensor 110 and a humidity sensor 112 can be provided to correct the data processing and reduce errors. A camera 114 can also be added to provide a visual reference during operation. The output from the system can provide both data output and visual output.

In operation, the electric field sensor receives an electric field within a few microseconds after a lighting strike. A sonic wave arrives at the sonic sensors following the electric field. The sonic field reaches each sensor within milliseconds of each other, since the distance to the striking point is different for each sonic sensor. Based on the differences in the time of arrival of the sonic wave at each sensor, a set of equations is solved to determine the angle of arrival of the sonic waveform. The differences in the time of arrival can be precisely measured by performing digit cross-correlations among the signals received by the five sensors. The distance to the lighting strike is determined by the time elapsed from the detection of the electric field to the detection of the thunder signal (sonic). The speed of sound can be estimated by monitoring the ambient temperature and automatically compensating for any deviations during the course of the day. A look-up table is used to determine the correct sound speed to use for the calculation of the distance to the lightning strike.

Digital signal processing techniques are used to discriminate between thunder waveforms from a close lightning strike (within about a 1-mile radius) and thunder waveforms from a preceding distant strike. This process is important since, during the active phase of a thunderstorm, lightning activity could occur at a rate exceeding 10 strikes per minute. The discrimination between close and distant thunder is based on the frequency content of the thunder waveform. Propagation through the air causes the high-frequency components to attenuate much faster than the lower frequencies. Thunder generated within short distances has typical high frequency components (a "clap" of initial sound) followed by the longer duration rumble. Thunder from more distant waveforms lose their high-frequency components and no "clap" sound is heard.

A designer of a single station sonic lightning location system can select the geometry of the sonic sensor microphones in a variety of manners depending on the portion of the sky that is of greatest interest. The analysis provided herein allows a designer to calculate the accuracy of direction of arrival estimates based on user provided locations of the sensor microphones and the timing accuracy possible. The timing accuracy is based on the electronic and digital design of the detection system and also on the nature of the thunder waveforms actually experienced under field conditions. The math presented provides the estimated azimuth and elevation of the source and estimates of the confidence levels of these estimates (error ellipse).

The practically instantaneous arrival of the electromagnetic pulse is detected with the broad band antenna 102 which starts a timer in the processor 106. When the thunder signal arrives at a selected microphone 104, sonic sensor, the timer is stopped. A variety of techniques for digital signal processing can be used to start and stop the timer and will not be addressed here. A signal analysis technique is used to select only nearby events by filtering, see U.S. application Ser. No. 09/784,405 filed Feb. 13, 2001. Any known technique can be used to estimate a time delay of arrival of a sonic or thunder pulse accurate to within a few microseconds. This time delay is multiplied by c, the speed of sound, to estimate the slant range to the lightning attach point ("ground" contact). With the speed of sound of roughly 300 meters per second, this provides estimation accuracy on the order of a centimeter or less. However, the variation of the speed of sound with temperature and humidity and the effects of wind degrade this ideal performance.

Wind velocities are significantly lower than sonic velocity. For example a wind speed of 50 miles per hour equates to 22.6 meters per second, only 7.5% of the speed of sound (approximately 300 m/s). The thunder leaves the lightning channel as a cylindrical wave front with a velocity that is the vector sum of the wind speed and the sonic speed. This affects the overall travel time to the sensor, used to estimate the slant range, and potentially, the curvature of the wave front at the sensor affects the estimated azimuth and elevation (for the single station system). Assuming that the lightning channel is vertical and the wind velocity vector is strictly horizontal, any effects to the estimated elevation angle can be ignored. This reduces the problem to two dimensions.

Figure 2:
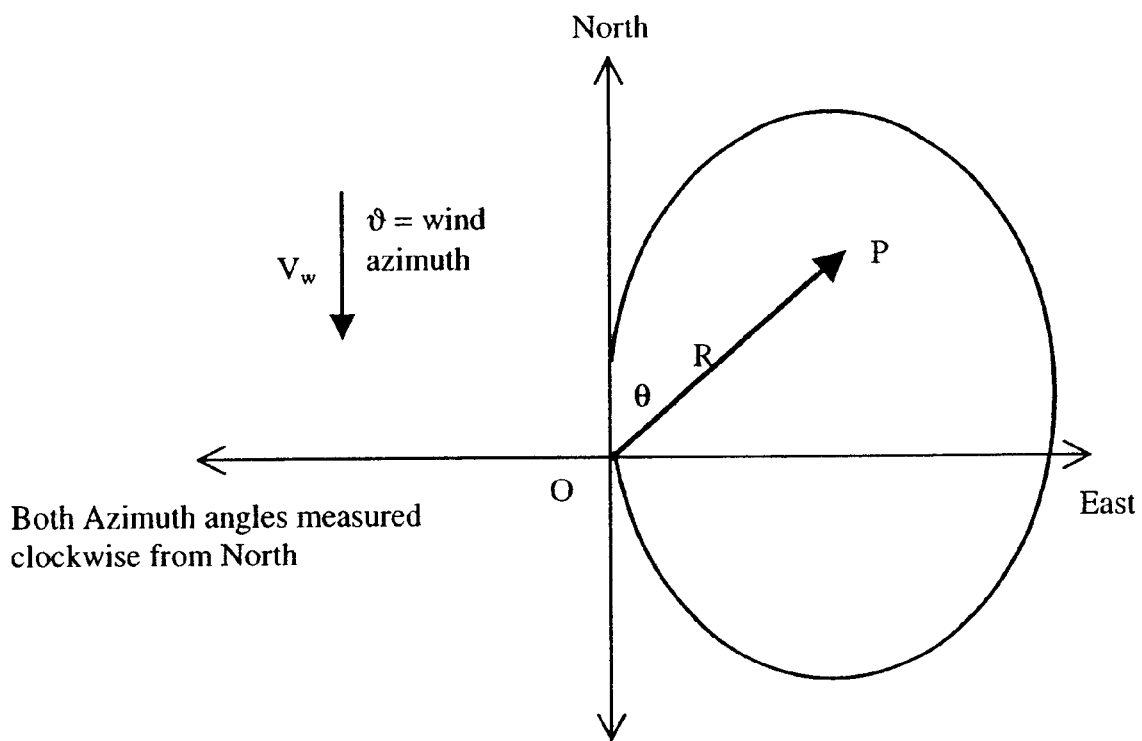
FIG. 2 illustrates a shape of a wave front distorted by wind.

As shown in FIG. 2, a lightning location point is given by P and the sensor location is at the origin O. The wind velocity (to the south in the figure) distorts the wave front by adding the components of the wind velocity to each wave front velocity vector. In the presence of wind, the velocity vector of the wave front measured along an azimuth θ is given by:

$$\vec{V}(\theta) = \vec{c} - |\vec{V}_W|\cos(\theta - \partial) \quad (1)$$

The second term of equation (1) measures the contribution of the wind along the line of sight to the event P. The minus sign comes from consideration of the angles involved. Note that when $\partial$ is greater than $\theta$ (as in FIG. 2) the sign of the cosine term changes to plus increasing the effective wavefront velocity. Thus, in the presence of wind, the wave front arrives sooner or later than it would in still air. Designating "ΔT" as the time delay between the lightning flash and the thunder arrival and recognizing that wind has no effect on the electromagnetic propagation time, the range is:

$$R = \Delta T \cdot V = \Delta T \cdot (c - V_W \cos(\theta - \partial)) \quad (2)$$

This equation must be inverted so that the measurement ΔT is expressed in terms of unknown variables:

$$\Delta T = \frac{R}{(c - V_W \cos(\theta - \partial))} \quad (3)$$

The value of c changes with temperature and humidity (molecular weight of the atmosphere). The value of sound speed in a gas is given by:

$$c = (\gamma R_0 T/M)^{1/2} \quad (4)$$

where γ is the ratio of specific heats, $R_0$ is the universal gas constant (8314 J kg$^{-1}$K$^{-1}$), T is the absolute temperature and M is the molecular weight. The speed of sound varies as the square root of the temperature. The speed of sound increases by 0.6 m/s for each degree increase in Celsius temperature. This significant effect should be corrected using temperature sensor 110. The presence of water vapor causes both γ and M to decrease. The water vapor effect can often be ignored since its correction is typically less than 1.5%. However, if humidity data is available to the system it would be advisable to correct for its effects. To preserve accuracy, an external measurement of local wind speed and temperature may be desired. Measuring humidity provides a smaller benefit. If such measurements are provided the range accuracy of the present single station system is quite high.

Figure 3:
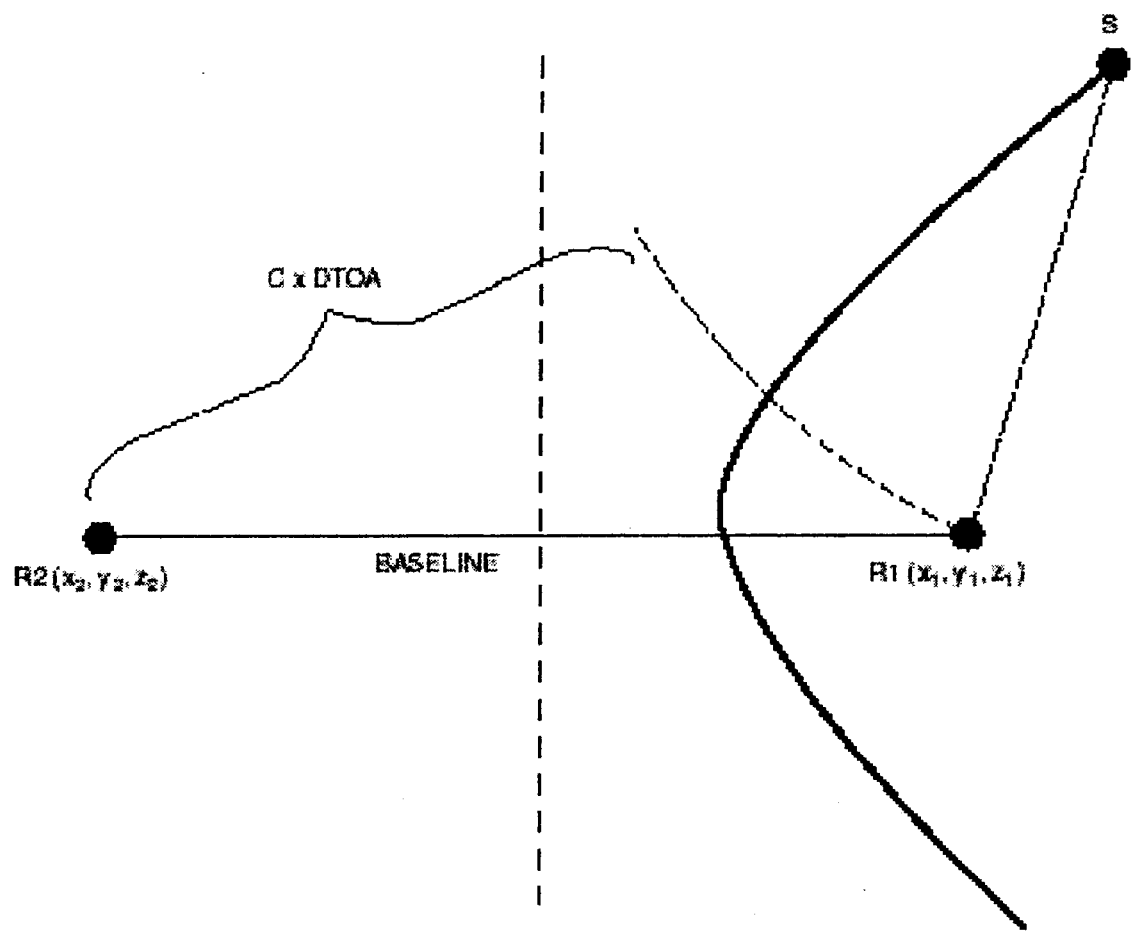
FIG. 3 illustrates a baseline and hyperbola.

Any two sonic receivers (R) form a "baseline," that is a line connecting the two receiver coordinates. The location of a source S that produces a signal lies on a hyperbola in the plane formed by two microphones and the lightning source, see FIG. 3. For each point on a hyperbola, the difference between the distances to the two foci is a constant. Each microphone forms a focus of the hyperbola. This distance difference is the difference time of arrival (DTOA), in time units, times the speed of sound c. The location of S is unknown and, hence, the orientation of the plane, S lies on a "hyperbola of revolution" or a hyperbolic cone given by rotating the hyperbola around the axis defined by the baseline.

Figure 4:
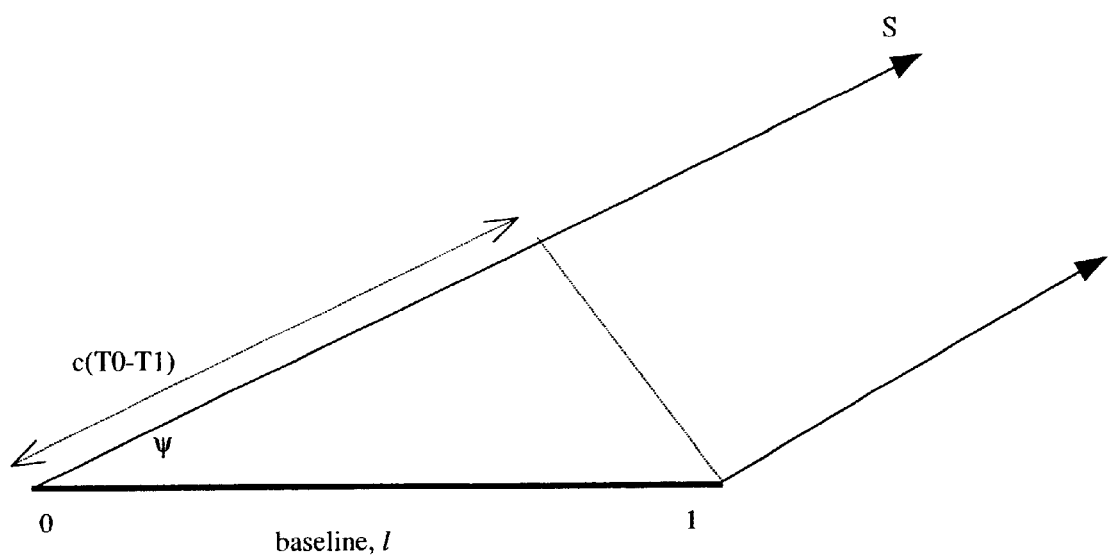
FIG. 4 illustrates a baseline and hyperbola with an infinite source.
Figure 5:
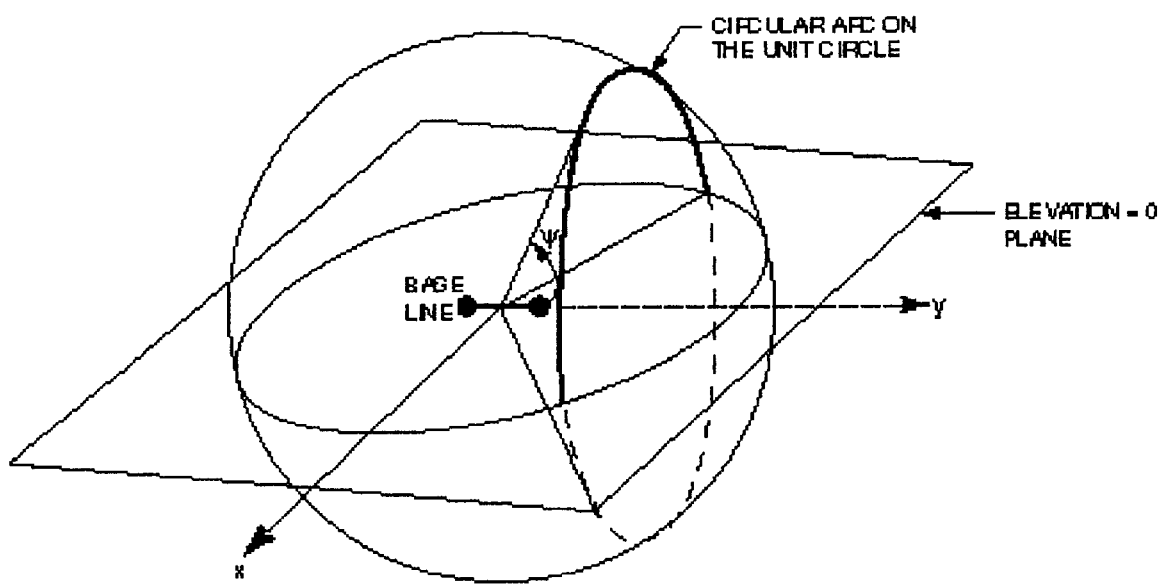
FIG. 5 illustrates a baseline and a location cone.
Figure 6:
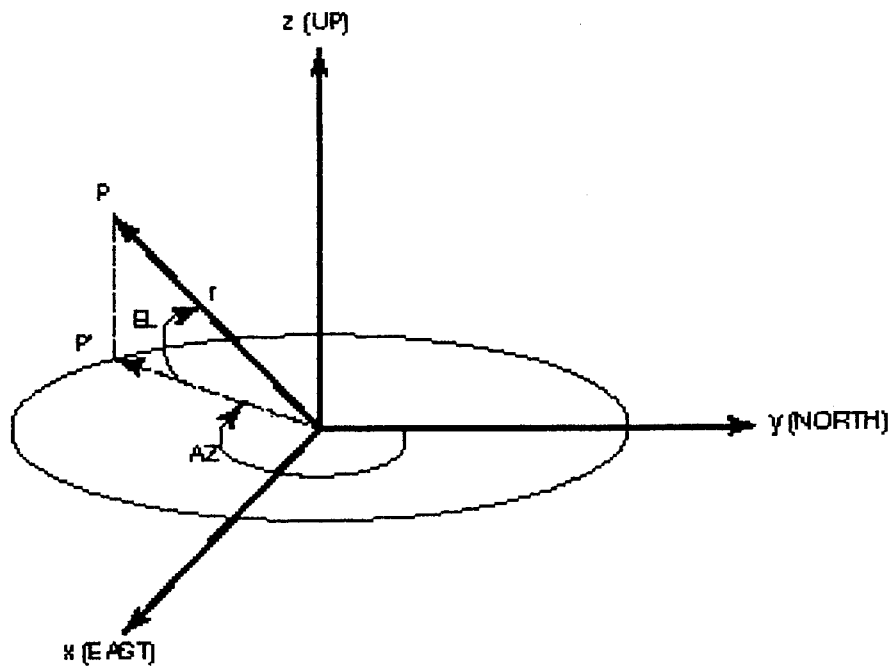
FIG. 6 illustrates a definition of AZ and EL.

The curve of a hyperbola, away from the origin, asymptotically approaches a straight line that deviates from the baseline with interior angle ψ, see FIG. 4. In the present invention, only distant points relative to the length of the baselines are used. Therefore, the equations are simplified by using only straight lines instead of hyperbolic curves. When the straight line is rotated about the axis, it generates a circular cone (FIG. 5).

The present system measures a time difference in microseconds between the time of signal arrival at one microphone minus the time of arrival to a second microphone. This DTOA times c, the speed of sound, is a distance difference. The measured TOA from microphone 1 is T1, and the measured TOA from microphone 0 is T0 then:

$$\Delta T_{01} = T0 - T1 \quad (5)$$

If the $\Delta T_{01}$ term is positive, then T0 is a larger number and is later in time; the event reached "1" first. Therefore, the cone angles toward microphone 1. Likewise, if $\Delta T_{01}$ is negative, the event reached "0" first and the cone opening lies toward microphone 0 (ψ>π/2). The cone of constant $\Delta T_{01}$ forms a constant angle between the baseline and the cone surface ψ (FIG. 2). In terms of the $\Delta T_{01}$, for sources far away from the baseline:

$$c\Delta T_{01} = l_{01} \cos \psi \quad (6)$$

So that the cone angle ψ is given by:

$$\psi = \arccos\left(\frac{c}{l_{01}}(T0 - T1)\right) \quad (7)$$

This cone traces a circular arc on the sky. Using multiple baselines can be used to produce multiple arcs, such that their intersection defines the azimuth and elevation of the source. In order to accomplish this, the baseline orientation is defined in terms of azimuth and elevation, which, coupled with the above DTOA equation, allow the definition of the arc. The AZ and EL angles can be defined in terms of local Cartesian coordinate system. The orientation of each receiver pair baseline and the direction to each source in terms of AZ and EL is expressed as follows. The locally flat Cartesian coordinate system is called (east, north, up) for (x, y, z) respectively. The azimuth AZ and elevation EL angles are defined with reference to FIG. 5. Assuming that the reference receiver (point 0) lies at the point (x0, y0, z0)=(0, 0, 0). The baseline vector is defined as the vector from (0, 0, 0) to the receiver listed first in the DTOA equation. So that the baseline "10" vector runs from the point (0, 0, 0) to (x1, y1, z1). This vector defines a baseline orientation in terms of azimuth and elevation. The azimuth is measured from the north (y axis) in a clockwise direction. The elevation angle is measured up from the (x, y) plane. Points lying in the (x, y) plane define position vectors with a zero elevation angle.

The baseline vector is therefore given by:

$$\vec{1}_{10} = (x_1 - 0)\hat{i} + (y_1 - 0)$$

$$\hat{j} + (z_1 - 0)\hat{k} \quad (8)$$

The length of this vector is given by:

$$\|\vec{l}_{10}\| = \sqrt{x_1^2 + y_1^2 + z_1^2} = l_{10}, \quad (9)$$

where $l_{10}$, $l_{20}$ and $l_{30}$ indicate the length of three baselines vectors. It must be kept in mind that the results below will depend on the sign of the DTOA, which is implicitly affected by the direction assumed for the baseline vector. Given a point $(x_o, y_o, z_o)$, which could be an antenna or a source point, it is transformed to spherical coordinates as follows, where again l denotes the length of the vector from the origin to the point, see FIG. 5:

$$z_o = l \sin EL$$

$$x_o = l \sin AZ = l \cos EL \sin AZ$$

$$y_o = l \cos AZ = l \cos EL \cos AZ \quad (10)$$

Since we are only interested in AZ, EL, we divide through by the length and solve for the angles:

$$EL = \arcsin\left(\frac{z_o}{l}\right) \quad (11a)$$

$$AZ = \arctan\left(\frac{y_o}{x_o}\right) \quad (11b)$$

The angles of the baseline vector can be defined using receiver 0 as the reference origin (0, 0, 0):

$$EL_{10} = \arcsin\left(\frac{z_1}{\sqrt{x_1^2 + y_1^2 + z_1^2}}\right)$$

$$AZ_{10} = \arctan\left(\frac{y_1}{x_1}\right) \quad (12)$$

Equation (12) defines the AZ and EL of any point in terms of our Cartesian system.

The following section derives the equation for the arc on the sky based on a measured delta T, baseline length, and baseline orientation, and is a general treatment which can be solved for any baseline orientation. Given a source point $S(x_s, y_s, z_s)$ or, in spherical polar coordinates, $(l_s, AZ_s, El_s)$ and a baseline unit vector:

$$\left(\frac{c}{l_{01}}(T0 - T1)\right) \quad (13)$$

Expressing the vector pointing from the origin to the source point:

$$\bar{s} = x_s \hat{i} + y_s \hat{j} + z_s \hat{k} \quad (14)$$

and its corresponding unit vector:

$$\hat{s} = \frac{x_s}{r_s}\hat{i} + \frac{y_s}{r_s}\hat{j} + \frac{z_s}{r_s}\hat{k} \quad (15)$$

Note that the dot product between these two vectors is equal to the cosine of the angle between them.

$$\hat{s} \cdot \hat{l} = \cos \psi \quad (16)$$

The dot product is given by the sum of the products of the three components:

$$\hat{s} \cdot \hat{l} = \frac{x_s}{r_s} \cdot \frac{x_1}{r_1} + \frac{y_s}{r_s} \cdot \frac{y_1}{r_1} + \frac{z_s}{r_s} \cdot \frac{z_1}{r_1} \quad (17)$$

Using the following spherical coordinate conversion formulas (equation 10) to express the dot product in terms of angles:

$$\hat{s} \cdot \hat{l} = \cos EL_s \sin AZ_s \cos EL_1 \sin AZ_1 + \cos EL_s \cos AZ_s \cos EL_1 \cos AZ_1 + \sin EL_s \sin EL_1 \quad (18)$$

Rearranging:

$$\hat{s} \cdot \hat{l} = \cos EL_s \cos EL_1 \sin AZ_s \sin AZ_1 + \cos EL_s \cos EL_1 \cos AZ_s \cos AZ_1 + \sin EL_s \sin EL_1 \quad (19)$$

Using $$\cos \psi = \left(\frac{c}{l_{01}}(T0 - T1)\right), \quad \text{(equation 7)}$$

the equations for an arbitrary baseline becomes:

$$\frac{c}{l_{01}}(T0 - T1) = \cos EL_S \cos EL_1 \sin AZ_S \sin AZ_1 + \cos EL_S \cos EL_1 \cos AZ_S \cos AZ_1 + \sin EL_S \sin EL_1 \quad (20)$$

Each baseline in the system produces an equation 20. Solving the set of equations for an array of baselines is addressed below. In order to solve for the azimuth and elevation of a distant source, at least three baselines are needed. The lines of position provided by each baseline describe latitude type lines (i.e. not great circles) across the sphere of the sky. Two baseline-derived lines of position (LOP's) intersect at two points. A third baseline is required to resolve the ambiguity.

Four sensors are needed to obtain three baselines. Care must be taken in selecting the baselines produced by the four sensors. In particular, three independent sets of baselines must be chosen such that one baseline cannot be expressed as the difference between two others. This causes the matrix equations to have a lower rank than three and be under determined. This effect prevents production of three baselines from three sensors. Beyond this constraint, however, the system can actually select the arrangement of baselines to provide the best solution for each particular event, if the system geometry allows it. Therefore, all of the solutions are over-determined in the sense that there are more equations than unknowns. There may also be constraints such as the ground level that can restrict solutions to portions of the sky (so that elevation angles can only be between zero and positive pi over two).

Since each baseline measurement contains errors, it is desired to find the solution AZ and EL point that minimizes the sum of the square errors. The solution point is called $(AZ_{EST}, EL_{EST})$ and using this point the expected $\Delta T$'s for each baseline can be computed:

$$\Delta T_i = \frac{l_i}{c}(\cos EL_s \cos EL_i \sin AZ_s \sin AZ_i + \cos EL_s \cos EL_i \cos AZ_s \cos AZ_i + \sin EL_s \sin EL_i) \quad (17)$$

The angles that involve the $i^{th}$ baselines can be defined as constants as follows:

$$\alpha_i = \cos EL_i \sin AZ_i, \ \beta_1 = \cos EL_i \cos AZ_i, \ \gamma_i = \sin EL_i \quad (18)$$

With cos EL equal to CEL and sin AZ is SAZ, these changes simplify equation 17 to:

$$\Delta T_i = \frac{l_i}{c}(\alpha_i CEL\,SAZ + \beta_i CEL\,CAZ + \gamma_i SEL) \quad (19)$$

A nonlinear regression on this set of equations produces a least squares estimate of the (AZ, EL) of the source. An initial very rough estimate of the source location must first be produced. This can be done in several ways but a method is recommended whereby the closest grouping of three intersections is identified. This can be accomplished by creating a table of computed delta T's for each 10 degree by 10–degree patch of sky. Since AZ runs from 0 to 360 degree and EL runs from 0 to 90 degrees, this results in a listing of 324 delta T sets (3 values each). The actual delta T's can then be subtracted from each computed delta T then squared. By finding the smallest value in this list, an estimate is provided of the correct value. Using this as a starting value, the delta T functions can be extended in a Taylor series around the estimating starting point. By using only the first order terms of the series, a set of linear equations is obtained as follows:

$$\Delta T_{Measured\,i} = \Delta T_{Estimated\,i} + \frac{\partial \Delta T_i}{\partial AZ_{Est}}(\Delta AZ) + \frac{\partial \Delta T_i}{\partial EL_{Est}}(\Delta EL) \quad (20)$$

The partial derivative terms are computed as follows:

$$\frac{\partial T_i}{\partial AZ_{Est}} = \frac{l_i}{c}(\alpha_i CEL_{Est}\,CAZ_{Est} - \beta_i CEL_{Est}\,SAZ_{Est}) \quad (21a)$$

$$\frac{\partial T_i}{\partial EL_{Est}} = \frac{l_i}{c}(-\alpha_i SEL_{Est}\,SAZ_{Est} - \beta_i SEL_{Est}\,CAZ_{Est} + \gamma_i CEL_{Est}) \quad (21b)$$

Since the values of all of the parameters are known, these terms reduce to numbers for any particular choice of estimated AZ and EL position. With 3 (or more) baselines, a matrix equation is constructed which is linear in the differences in the delta T's and the corrections to AZ and EL. With:

$$\delta \Delta T_i = \Delta T_{Measured\,i} - \Delta T_{Estimated\,i} \quad (22)$$

the matrix equation can be written as:

$$\begin{pmatrix} \delta\Delta T_1 \\ \delta\Delta T_2 \\ \delta\Delta T_3 \end{pmatrix} = \begin{pmatrix} \frac{\partial T_1}{\partial AZ_{Est}} & \frac{\partial T_1}{\partial EL_{Est}} \\ \frac{\partial T_2}{\partial AZ_{Est}} & \frac{\partial T_2}{\partial EL_{Est}} \\ \frac{\partial T_3}{\partial AZ_{Est}} & \frac{\partial T_3}{\partial EL_{Est}} \end{pmatrix} \begin{pmatrix} \Delta AZ \\ \Delta EL \end{pmatrix} \quad (23)$$

This can be written in matrix vector notation as:

$$\delta\Delta T = H\Delta\Theta \quad (24)$$

This is solved using the generalized inverse (multiply both sides by the transpose of matrix H then take the inverse of the now square $H^T H$). The solution is written as follows:

$$\Delta\Theta = (H^T H)^{-1} H^T \delta\Delta T \quad (25)$$

The values of delta AZ and delta EL are added to the original estimated values of AZ and EL to produce a new estimate. The values of the squared $\delta\Delta T$ terms are summed. The process is repeated with the new estimate until the sum of the squared residuals no longer decreases. This represents an un-weighted least squares estimate.

An optimal solution would weight each baseline based on the inherent accuracy provided. Returning to the original equation for the delta T as a function of cosine of the angle between the baseline and the direction to the source:

$$\Delta T = \frac{l}{c}\cos\psi \quad (26)$$

and taking the derivative of both sides (leaving l constant of course):

$$d\Delta T = -\frac{l}{c}\sin\psi\,d\psi \quad (27)$$

Rearranging to find the error in angle (dψ) with error in delta:

$$\frac{d\psi}{d\Delta T} = -\frac{c}{l\sin\psi} \quad (28)$$

This error function is a minimum when ψ is at 90 degrees, when the source is directly broadside to the baseline. The function has a singularity at ψ equal to 0 or 180 degrees. A weighing function is selected that gives more weight to baseline measurements taken when delta T is very small and giving little weight to measurements where delta T is near its maximum value (l/c). This relationship is expressed in terms of variances by squaring:

$$\sigma_\psi^2 = \frac{c^2}{l^2 \sin^2\psi}\sigma_{\Delta T}^2 \quad (29)$$

By using a trigonometric identity, the angle ψ is eliminated and delta T is used instead:

$$\sigma_\psi^2 = \frac{\sigma_{\Delta T}^2}{\frac{l^2}{c^2} - \Delta T^2} \quad (30)$$

When combining measurements from various baselines, it is desired to weight the results to favor those baselines with lesser errors. To do this, a weight matrix W is introduced. This matrix has the properties that it is diagonal (which assumes measurements are uncorrelated) and that its trace is equal to one (does not change the value of the final result). Assuming that the basic errors in timing determination are the same for each baseline, a fixed value to the timing variance is assigned. The measurements can be weighed as follows:

$$W = \frac{1}{\sum_{i=1}^{3}\frac{1}{\sigma_{\psi i}^2}} \begin{pmatrix} \frac{1}{\sigma_{\psi 1}^2} & 0 & 0 \\ 0 & \frac{1}{\sigma_{\psi 2}^2} & 0 \\ 0 & 0 & \frac{1}{\sigma_{\psi 3}^2} \end{pmatrix} \quad (31)$$

This weight matrix is employed to obtain a weighted least square estimate by multiplying both sides of the model equation then rearranging into the generalized inverse. This proceeds as follows:

$$W\delta\Delta T = WH\Delta\Theta \qquad (32)$$

Solving for the angle adjustments:

$$\Delta\Theta = (H^T W H)^{-1} H^T W \delta\Delta T \qquad (33)$$

Using this equation, the measurement variances can be propagated into the covariance matrix of the AZ, EL angles solution. The covariance matrix of measurements is composed of the variances of the measurements on the diagonal and the covariances or correlations off diagonal as follows:

$$COV(\Delta T_i) = E\{\varepsilon_{\Delta Ti}\varepsilon_{\Delta Ti}^T\} = \Sigma_{\Delta T} = \begin{pmatrix} \sigma_1^2 & \sigma_{12} & \sigma_{13} \\ \sigma_{21} & \sigma_2^2 & \sigma_{23} \\ \sigma_{31} & \sigma_{32}^2 & \sigma_3^2 \end{pmatrix} \qquad (34)$$

Since it is assumed that the errors are the same for each baseline and they are not correlated, this reduces to the identity matrix times a single measurement covariance:

$$\Sigma_{\Delta T} = \sigma_{\Delta T}^2 I \qquad (35)$$

The covariance matrix of the angle solution is found by using the weighted generalized inverse equation above:

$$\Sigma_\Theta = (H^T W H)^{-1} H^T W \Sigma_{\Delta T} \qquad (36)$$

The covariance matrix for the angles is given by the following:

$$\Sigma_\Theta = \begin{pmatrix} \sigma_{AZ}^2 & \sigma_{ELAZ} \\ \sigma_{AZEL} & \sigma_{EL}^2 \end{pmatrix} \qquad (38)$$

This matrix is positive symmetric and therefore defines an ellipse on the sky centered around the estimated source point. The ellipse has semimajor and semiminor axes and inclination to the azimuth axis are defined by:

$$a^2 = \frac{1}{2}(\sigma_{AZ}^2 + \sigma_{EL}^2) + \sqrt{\frac{1}{4}(\sigma_{AZ}^2 - \sigma_{EL}^2)^2 + \sigma_{AZEL}^2} \qquad (39)$$

$$b^2 = \frac{1}{2}(\sigma_{AZ}^2 + \sigma_{EL}^2) - \sqrt{\frac{1}{4}(\sigma_{AZ}^2 - \sigma_{EL}^2)^2 + \sigma_{AZEL}^2} \qquad (40)$$

$$\tan 2\gamma = \frac{2\sigma_{AZEL}}{\sigma_{AZ}^2 - \sigma_{EL}^2} \qquad (41)$$

Note that the angular portion of the sky is being treated as being locally Cartesian which is valid since this is a small patch of sky. If the input values for timing error represent one standard deviation of a random sampling of such timing errors then the sigma's above also represent a similar confidence region (i.e. 68.3% of expected events occur with ±σ of the estimated point. However, the ellipse, because it represents cross correlations will enclose only 39.4% of events for the same 1 sigma input. This low confidence level may cause some users to utilize an ellipse enclosing a 95% confidence limit, which requires use of 2.447 times one sigma for the measurement input.

The tools presented herein allow one to compute the error ellipse properties for all portions of the sky given the configuration of the baselines (lengths, angles, timing errors) and thereby compare different configurations of detection systems and perform studies regarding accuracies required and so on. This also allows the computation of the expected accuracy for specific detected events and to describe the error ellipse onto an image of the scene to assist in identifying the location of the lightning attachment.

A question arises regarding the change in apparent direction to the source caused by the wind. This effect could be serious in the case of the present single station system. An embodiment of the sensor array is made of individual detectors spaced a distance D apart, where D is a characteristic dimension rather than an exact dimension (for estimation purposes). At a range R, a distance D subtends an angle dθ. Since dθ is very small:

$$D \cong R \cdot d\theta \qquad (42)$$

The following analysis shows that the wind does not significantly affect the measured angle of arrival. If the velocity as a function of θ is sufficient to cause an additional difference in time of arrival between the two sensors then the derived angle to the source will be incorrect. By taking the derivative of the velocity expression as a function of angle θ, the time difference measured can be derived. The derivative of V with angle is:

$$\frac{dV}{d\theta} = V_W \sin(\theta - \vartheta) \qquad (43)$$

With an expression for dθ in terms of R and D:

$$\Delta V = \frac{D \cdot V_W}{R} \sin(\theta - \vartheta) \qquad (44)$$

Applying this expression to the expression involving ΔT and velocity, the additional ΔT or the δΔT as a function of array dimension, range and wind velocity can be estimated as:

$$\delta\Delta T = -\frac{R}{V^2}\Delta V \cong \frac{D \cdot V_W}{c^2 \sin(\theta - \vartheta)} \qquad (45)$$

With an array dimension of one meter, a wind speed of 50 mph (22.6 m/s), a range of 100 meters, and the sine function equal to one (wind along direction to source); a timing skew of only 0.00025 seconds is found. This can be translated into angular error by remembering that for a baseline D between two receivers that measure a time of arrival difference of ΔT, the angular error caused by an error in ΔT is:

$$d\psi = \left(\frac{c}{D}\right)\frac{-1}{\sin\psi}\delta\Delta T \qquad (46)$$

The angle ψ is used to differentiate this angle from the azimuth to the source (which is derived from a number of baseline angles). Inserting in the value for ψ as 45 degrees (sine equals 0.7071) and using the previous numbers for timing error and so on, an angle error of 0.106 radians or 0.0019 degrees or 6.7 seconds of arc is determined.

In the above example, the range error was roughly equal to the ratio of the wind speed to the sound speed which is significant. For the case of angular determination, the error was so small that it can be neglected. This means that the single station system may require and external source of wind speed and direction to correct the measured range values (or be accepted as a known systematic error).

In an alternate method, using an array of three baselines of equal length and mutually orthogonal (such that we have a baseline along our x, y, and z axes), an additional equation of constraint can be provided. The following sections indicate potential uses for that equation in assisting in the solution of direction finding problems. Equation 2 translates the $\Delta T$ measurements into the direction cosines between each axis and the vector pointing to the source. Remembering that the direction cosines for an orthogonal array follow the relationship:

$$1 = \cos^2 \alpha + \cos^2 \beta + \cos^2 \gamma \tag{47}$$

where $\alpha$, $\beta$, and $\gamma$ are the angles between the vector pointing to the source s and the x, y, and z baselines respectively. Equation 47 is used to perform a quick validation of the raw $\Delta T$ measurements, which is a key advantage of an orthogonal array. For orthogonal baselines:

| Baseline | Cos $EL_{01}$ | Sin $EL_{01}$ | Cos $AZ_{01}$ | Sin $AZ_{01}$ |
|---|---|---|---|---|
| 01 (x) | 1 | 0 | 0 | 1 |
| 02 (y) | 1 | 0 | 1 | 0 |
| 03 (z) | 0 | 1 | 0 | 0 |

Using these values in equation 17 results in three measurement equations relating the $\Delta T$'s to AZ and EL:

$(T_0 - T_1) = \cos EL \sin AZ$ $(T_0 - T_2) = \cos EL \cos AZ$ $(T_0 - T_3) = \sin EL$ (48)

Note that it is assumed that all of the l's are equal and l/c=1. The subscript "s" on the angles is also dropped. At the end of the derivations, the l/c coefficient is reinserted. To further simplify, "cos EL" is written as "CEL", etc. To solve (48), a minimum least-squared-error approach is used to find AZ and EL so that:

$\Sigma(\Delta T_{MEAS} - \Delta T_{THEORY})^2 = \text{Minimum}$ (49)

Each of the terms in parenthesis are call "residuals." To find the solution for AZ, a partial derivative of (49) is taken with respect to AZ and set to zero:

$$\frac{\partial}{\partial AZ}\{(\Delta T_{01} - CELSAZ)^2 + (\Delta T_{02} - CELCAZ)^2 + (\Delta T_{03} - SEL)^2\} = 0 \tag{50}$$

Evaluating this expression:

$$AZ = \tan^{-1}\left(\frac{\Delta T_{01}}{\Delta T_{02}}\right) \tag{51}$$

Note that the arc tangent has ambiguities due to multiple values of AZ with the same arc tangent. Solving for EL:

$$\frac{\partial}{\partial EL}\{(\Delta T_{01} - CELSAZ)^2 + (\Delta T_{02} - CELCAZ)^2 + (\Delta T_{03} - SEL)^2\} = 0 \tag{52}$$

and evaluating as above:

$$EL = \tan^{-1}\left\{\frac{\Delta T_{03}}{\Delta T_{01}SAZ + \Delta T_{02}CAZ}\right\} \tag{53}$$

The equations contain a couple of interesting results. First, equation (51) for AZ contains no dependence on $\Delta T_{03}$. This is because $\Delta T_{03}$ gives a line of position across the sky that is at a fixed EL and has no dependence on AZ.

Figure 7:
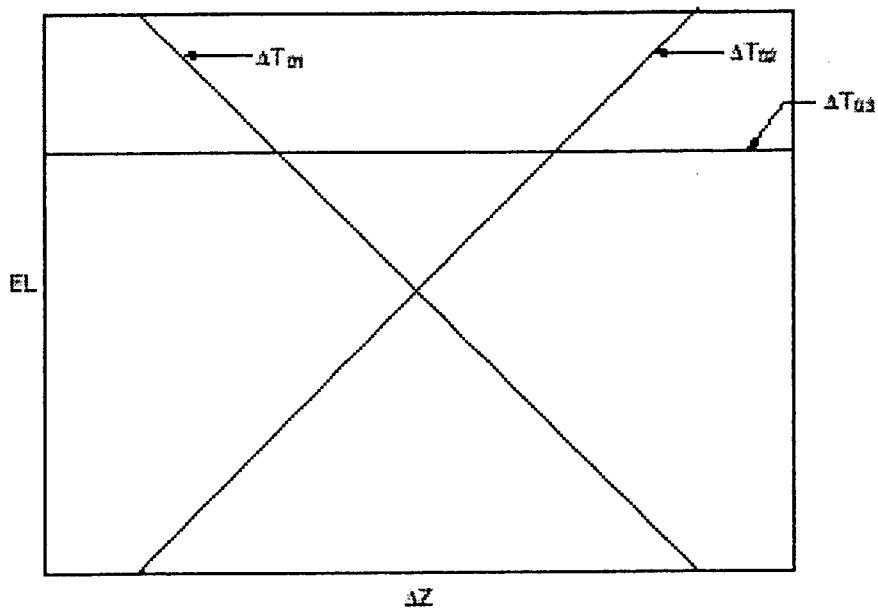
FIG. 7 shows a close-up of three intersecting lines of position.

Each measurement provides an arc that makes a large circle on the sky. If the measurements contain some errors, the three circles will not intersect at a single point but will form a triangle as shown in FIG. 7. Each corner of the triangle represents the AZ and EL solution found using only two of the three baselines. The question is where in AZ and EL is the "best" or most probable solution given the measured $\Delta T$'s?

Equations (41) and (42) provide the least squared error (i.e., the sum of the distances between the chosen AZ, EL point and the lines of position is a minimum). Unfortunately, this procedure is influenced strongly by a measurement that is in error so is not optimum.

Measurement errors consist of random and bias errors. Random errors are due to noise and other random processes in the measurement chain. Random errors are typically minimized by averaging a number of measurements. This is not possible in a lightning measurement system since the event only occurs once. Bias errors can, at least in theory, be eliminated through a process of calibration and affect, in some consistent way, all measurements. Bias errors that are unknown are generally treated as random since they are unknown.

To find how each measurement may be affected by random errors, equation (6) is examined and the derivatives of both sides are taken:

$$cd\Delta T = -l \sin \psi d\psi \tag{54}$$

Rearranging:

$$\frac{d\psi}{d\Delta T} = \left(\frac{c}{l}\right)\frac{-1}{\sin \psi} \tag{55}$$

This expression can be interpreted as the ratio of standard deviations. Taking the absolute value (since the timing error can be positive or negative):

$$\sigma_\psi = \left(\frac{c}{l}\right)\frac{1}{\sin \psi}\sigma_{\Delta T} \tag{56}$$

If the standard deviation of the timing difference error is 1 $\mu$s, the baseline length is 2 meters, and using a value of c equal to 330 m/s, we see that:

$$\sigma_\psi = \frac{(0.000165)}{\sin \psi} \times \left(\frac{180}{\pi}\right) \tag{57}$$

Where the last term converts from radians to degrees. The best accuracy is achieved when the source is at right angles to the baseline and is equal to 0.009 degrees (in the absence of other errors). Note that this is roughly ½ an arc minute.

Figure 8:
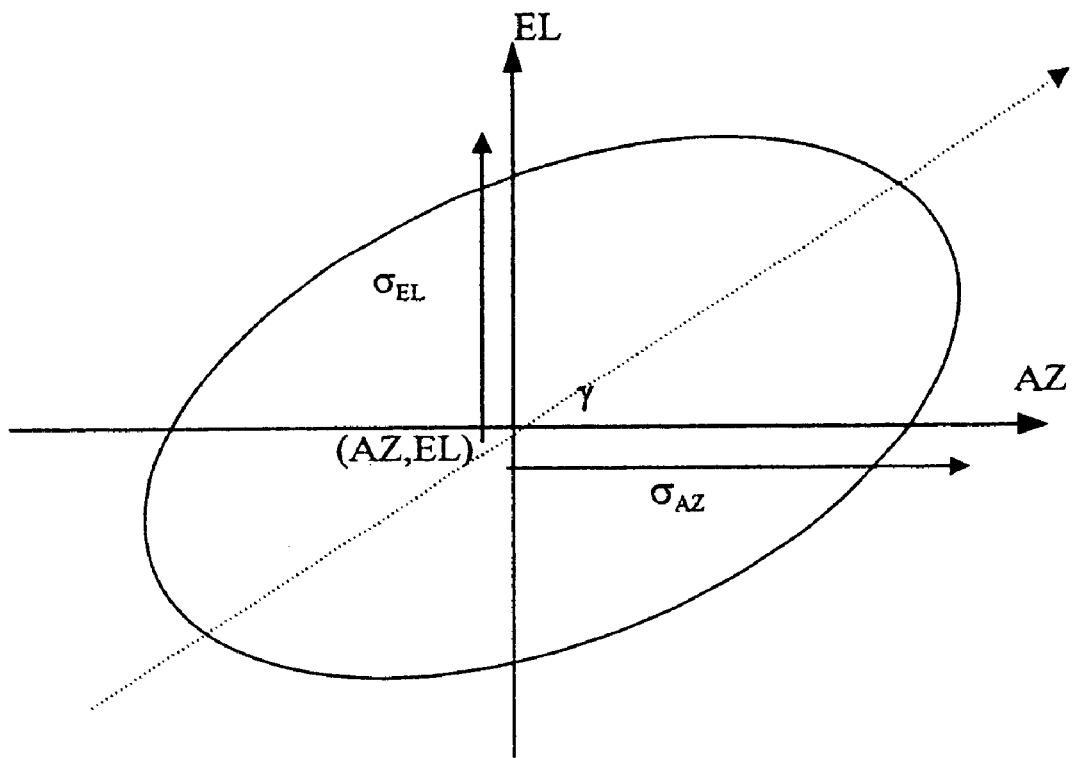
FIG. 8 is a conceptual diagram of an error ellipse.

FIG. 8 shows the angular accuracy as a function of $\psi$ ("delta psi denotes $\sigma\psi$ the standard deviation of $\psi$"). This indicates that, in areas where a given baseline is parallel to the incoming rays, it should probably be excluded from the solution.

Figure 9:
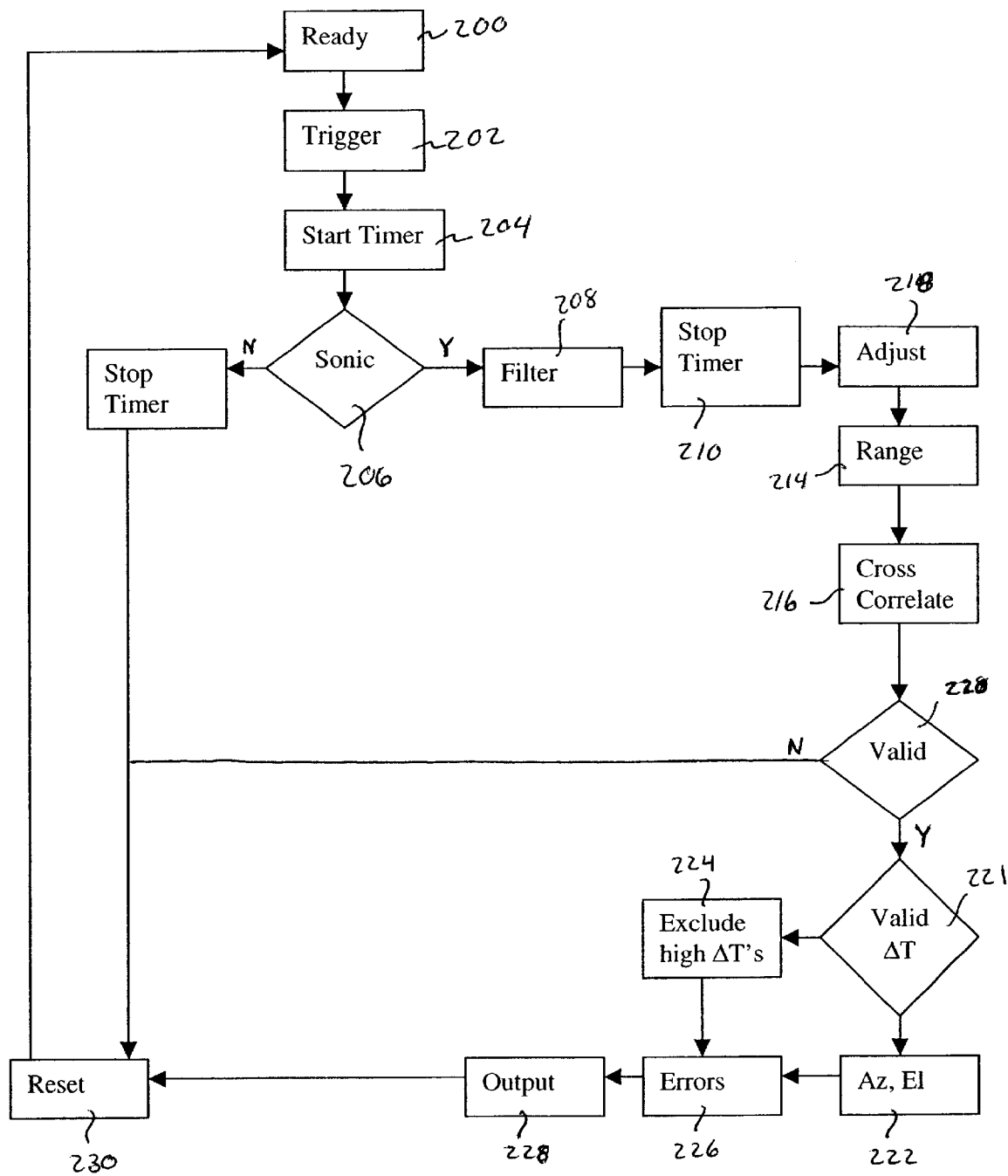
FIG. 9 is a flow chart of one method of the present invention.

One embodiment of a data processing algorithm is provided below, with reference to FIG. 9, which results in an estimate of the range, azimuth, and elevation of the source. The system is placed in a ready state 200 and waits for an electric field trigger event 202. A timer is started 204 upon trigger and the system waits for a sonic wave to be detected 206. If sonic data is not received by a predetermined threshold time, such as 150 μsec, the timer is stopped 212 and the system reset 230. If sonic data is received 206, the data is filtered for distant strikes 208 and the timer is stopped 210. A range for the strike is calculated 214 and the sonic data is cross-correlated 216. The range and sonic calculations can be adjusted for environmental conditions 218, such as wind, temperature and humidity. The data is validated 220 by taking the sum of the squares equal to "1" (equation 17). If the data is not valid, the system is reset. All ΔT's are validated 221 that they fall below "0.9." If valid, AZ and EL are calculated 222 using equations 21 and 22. If not valid, high ΔT measurements are excluded and the AZ and EL are calculated 224 using remaining equations in (18). AZ and EL errors are calculated 226 by setting values of ΔT higher and lower by 1 sigma, and AZ and EL are recomputed. AZ±ΔAZ, EL±ΔEL, R±ΔR are output 228 and the system is reset 230 for a next event.

The above algorithm is one embodiment of a methodology to approximate the location of a lightning strike, other methods can be implemented and the invention is not limited to the above methodology. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system to determine an approximate location of lightning strikes comprising:
    a single electric field sensor;
    a plurality of acoustic sensors approximately collocated with the electric field sensor; and
    a processor to determine a distance to lightning strikes based on a time differential between an electric field pulse and an acoustic wave at one of the plurality of acoustic sensors, and an angle of arrival based on a difference of time of arrival of the sonic wave at the plurality of acoustic sensors, wherein the processor outputs a range, azimuth and elevation to approximate the location of the lightning strike relative to the location of the system.

2. The system of claim 1 wherein the processor compensates for a speed of sound based on a measured temperature and/or humidity.

3. The system of claim 1 wherein the processor compensates for the time of arrival of the sonic wave using a measured wind speed.

4. The system of claim 1 wherein the processor provides an estimate of the accuracy of the approximate location.

5. The system of claim 1 wherein the plurality of acoustic sensors comprise five acoustic sensors.

6. The system of claim 5 wherein four of the five acoustic sensors are located on a perimeter of a circle on a horizontal plane, the electric field sensor is located inside the circle, and a remaining one of the five acoustic sensors is located vertically above the circle.

7. The system of claim 5 wherein four of the five acoustic sensors are located on a common horizontal plane.

8. The system of claim 7 wherein the electric field sensor is located on the common plane and between the four acoustic sensors.

9. The system of claim 8 wherein a remaining one of the five acoustic sensors is located vertically above the common plane.

10. The system of claim 6 wherein the circle has a radius of about 5 meters and the one acoustic sound sensor is located about two meters above the electric field sensor.

11. A system to determine an approximate location of lighting strikes comprising:
    an electric field sensor;
    a plurality of acoustic sound sensors collocated with the electric field sensor;
    a temperature sensor; and
    a processor to determine a distance to lighting strikes based on a time differential between an electric field pulse and an acoustic wave at one of the plurality of acoustic sensors, and an angle of arrival based on a difference of a time of arrival of the sonic wave at the plurality of acoustic sensors, the processor uses a look-up table to compensate for a speed of sound based on ambient temperature measured by the temperature sensor.

12. The system of claim 11 wherein the plurality of acoustic sound sensors comprise five acoustic sensors, wherein four of the five acoustic sound sensors are located on a perimeter of a circle on a horizontal plane, the electric field sensor is located above the circle, and a remaining one of the five acoustic sound sensors is located vertically above the circle.

13. The system of claim 11 wherein the processor further compensates for the speed of sound based on a measured humidity.

14. The system of claim 11 wherein the processor compensates for the time of arrival of the sonic wave using a measured wind speed.

15. The system of claim 11 wherein the processor outputs a range, azimuth, and elevation relative to the system.

16. The system of claim 15 wherein the processor further outputs an estimate of the accuracy of the range, azimuth, and elevation.

17. A method of determining an approximate location of a lightning strike comprising the following steps:
    measuring the ambient temperature;
    collecting lightning strike information, including a time of arrival of an electric field pulse using an electric field sensor and a time of arrival data of an associated sonic wave from a lightning strike, wherein the sonic wave data is detected using a plurality of acoustic sensors collocated with the electric field sensor; and
    processing the lightning strike information including compensating for a speed of sound based on the ambient temperature approximate the location of the lightning strike.

18. The method of claim 17 wherein compensating comprises accessing a look-up table.

19. The method of claim 17 wherein processing the lightning strike information comprises calculating an estimate of the accuracy of the approximate location of the lightning strike.

20. The method of claim 17 further comprises:
    measuring a wind speed;
    compensating for the time of arrival of the acoustic wave based on measured wind speed while processing the lightning strike information.

21. The method of claim 17 wherein a processor outputs a range, azimuth, and elevation relative to the sensors.

22. The method of claim 21 wherein the processor further outputs an estimate of the accuracy of the range, azimuth, and elevation.

23. The method of claim 22 further comprises indicating an estimate of the accuracy of the range, azimuth, and elevation.

24. A method for determining an approximate location of a lightning strike comprising the following steps:

detecting an electric field signal created by the lightning strike with a single electric field sensor;

detecting a sonic pulse created by the lightning strike with a plurality of approximately collocated acoustic sensors;

measuring a time of arrival difference between the electric field signal and the sonic pulse at one of the plurality of approximately collocated sensors to determine an approximate distance from the lightning strike to the electric field sensor;

measuring a time of arrival difference between the sonic pulse at each of the plurality of approximately collocated acoustic sensors to determine an angle of arrival of the sonic pulse; and providing a range, azimuth and elevation of the location of the lightning strike relative to the electric field sensor.

25. The method of claim 24 further comprises compensating for a speed of sound based on a measured temperature and/or humidity.

26. The method of claim 24 further comprises compensating for the time of arrival of the sonic pulse based on a measured temperature and/or humidity.

27. A method of designing a single station lightning location system comprising;

positioning a single electric field sensor;

defining at least a first geometry for locating a plurality of acoustic sensors about the single electric field sensor;

calculating an accuracy of direction of arrival estimates based on the at least first selected geometry;

defining a second geometry for locating the plurality of acoustic sensors about the single electric field sensor;

calculating an accuracy of direction of arrival estimates based on the second selected geometry; and comparing the accuracy of direction and arrival estimates based on the first and second geometries with the expected location of the lightning strike to determine the geometry providing the greatest accuracy in determining the range, azimuth and elevation of the lightning strike as compared to the location of the electric field sensor.

* * * * *